No. 798,074. PATENTED AUG. 29, 1905.
D. H. REIMERS.
POWER TRANSMITTING AND SPEED CONTROLLING MECHANISM.
APPLICATION FILED APR. 7, 1905.
3 SHEETS—SHEET 1.
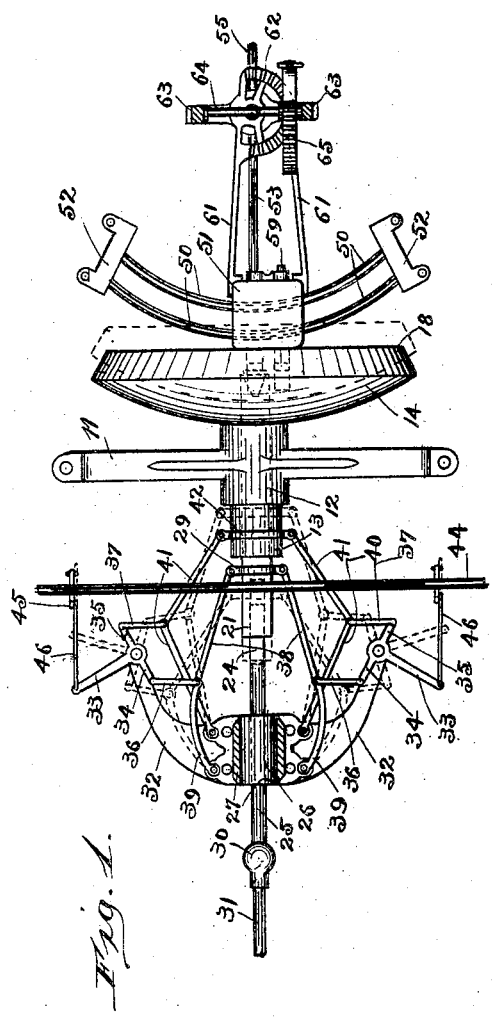
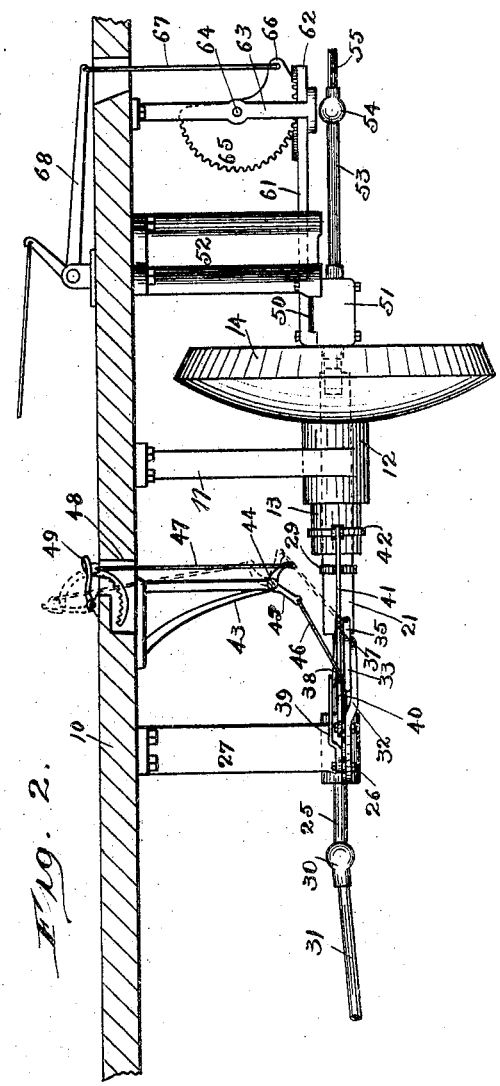
Witnesses:
Chas. E. Gorton.
A. Gustafson.
Inventor:
Dycke H. Reimers.
By. Chas. C. Tillman
Atty.

No. 798,074. PATENTED AUG. 29, 1905.
D. H. REIMERS.
POWER TRANSMITTING AND SPEED CONTROLLING MECHANISM.
APPLICATION FILED APR. 7, 1905.

3 SHEETS—SHEET 2.

Witnesses:
Chas. E. Gorton
A. Gustafson

Inventor:
Dycke H. Reimers
by Chas. C. Tillman
Atty

No. 798,074. PATENTED AUG. 29, 1905.
D. H. REIMERS.
POWER TRANSMITTING AND SPEED CONTROLLING MECHANISM.
APPLICATION FILED APR. 7, 1905.
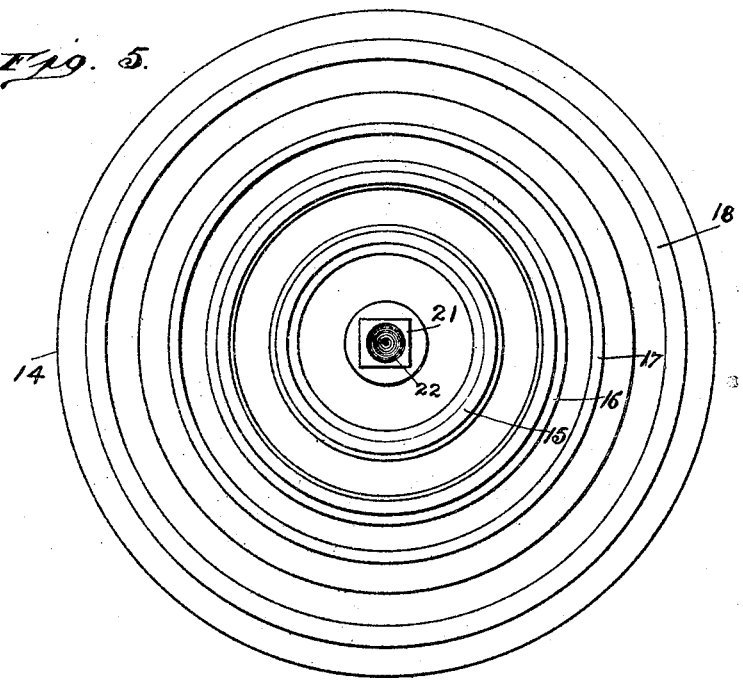
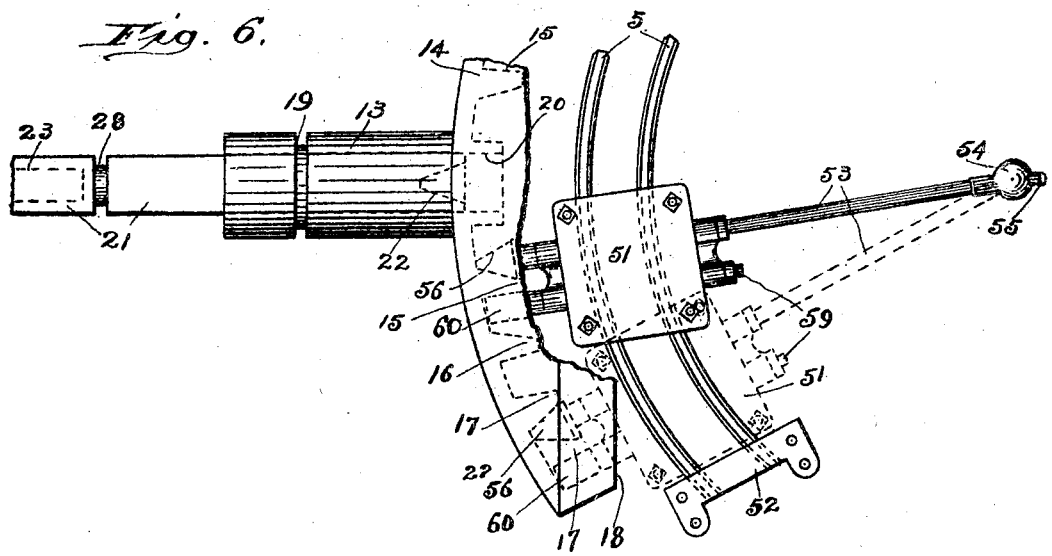

UNITED STATES PATENT OFFICE.

DYCKE H. REIMERS, OF CHICAGO, ILLINOIS.

POWER-TRANSMITTING AND SPEED-CONTROLLING MECHANISM.

No. 798,074.  Specification of Letters Patent.  Patented Aug. 29, 1905.

Application filed April 7, 1905. Serial No. 254,262.

*To all whom it may concern:*

Be it known that I, DYCKE H. REIMERS, a citizen of the United States, residing at Chicago, in the county of Cook and State of Illinois, have invented certain new and useful Improvements in Power-Transmitting and Speed-Controlling Mechanism, of which the following is a specification.

This invention relates to improvements in an apparatus to be used for the transmission of power and for regulating or controlling the speed of a machine, and while it is more especially intended for use on automobiles and will be hereinafter so described yet it is applicable for use on other kinds of machines; and it consists in certain peculiarities of the construction, novel arrangement, and operation of the various parts thereof, as will be hereinafter more fully set forth and specifically claimed.

The principal objects of the invention are to provide a mechanism or apparatus of the above-named character which shall be comparatively simple and inexpensive in construction, strong, durable, and efficient in operation, and so made that the transmission of power thereby will be positively effected and the rate of speed easily and accurately regulated from the highest to the lowest degree, or vice versa, as well as to enable the machine to be reversed.

A further object is to simplify the mechanism by so constructing it as to eliminate many of the parts commonly used in such devices, thus making it cheaper to manufacture.

Other objects and advantages of the invention will be disclosed in the subjoined description and explanation.

In order to enable others skilled in the art to which my invention pertains to make and use the same, I will now proceed to describe it, referring to the accompanying drawings, in which—

Figure 3:
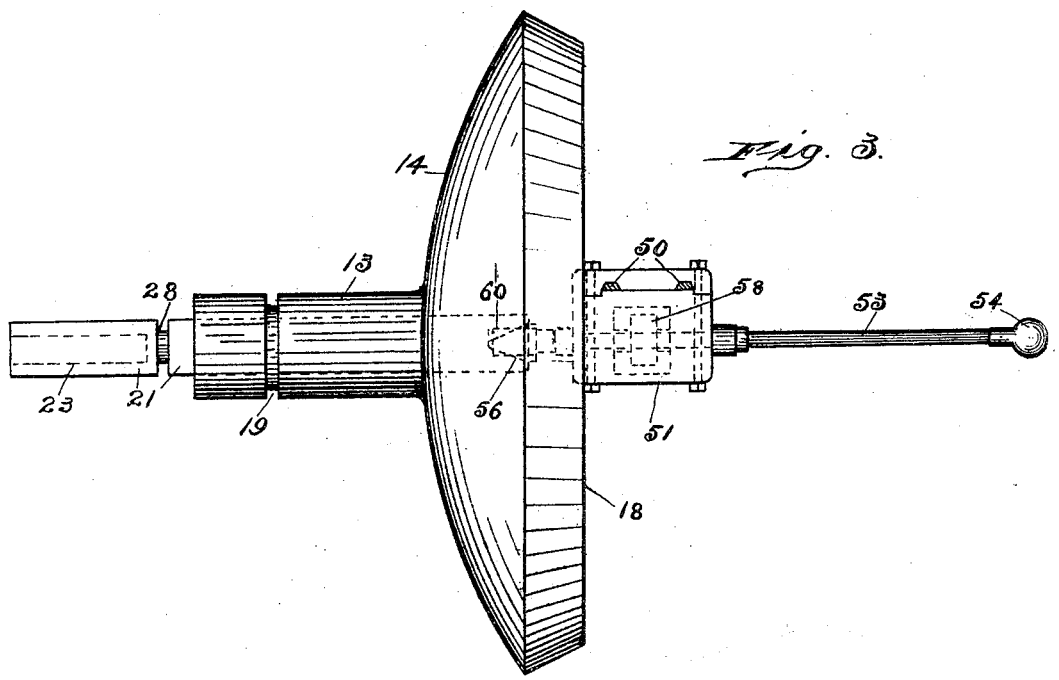
Figure 4:
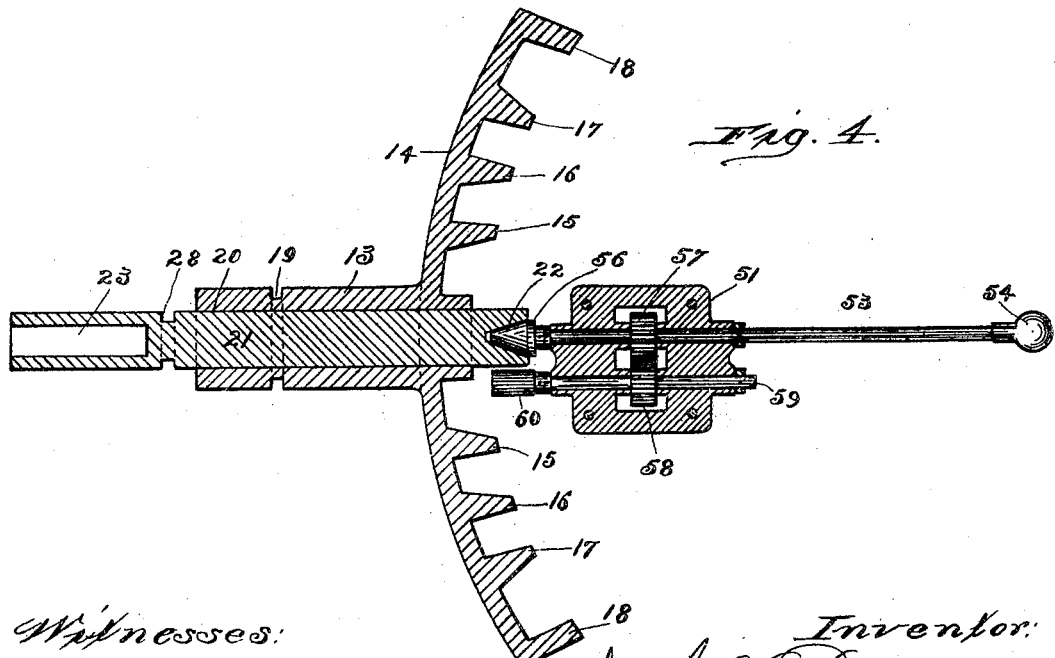

Figure 1 is a plan view of a mechanism embodying my invention, showing it detached from its support and illustrating by continuous lines the positions the various parts will occupy when geared for the highest rate of speed and by dotted lines the positions they will occupy when a lower rate of speed or the machine reversed is desired. Fig. 2 is a side view in elevation, showing the mechanism secured to its support or a portion of an automobile-frame. Fig. 3 is an enlarged view, in side elevation, of the friction-wheel and of the journal-box for the friction or driving rollers. Fig. 4 is a central horizontal sectional view of said parts. Fig. 5 is a face view of the friction wheel or disk; and Fig. 6 is a plan view of a fragment of the friction-wheel or disk and of a part of the track on which the movable journal-box for the friction or driving rollers travels, showing said box and rollers by continuous lines in the positions they will occupy when a medium rate of speed is desired and by dotted lines when it is desired to reverse the machine.

Like numerals of reference refer to corresponding parts throughout the different views of the drawings.

The reference-numeral 10 indicates the support for the mechanism, which support may be a portion of an automobile-frame, and for the sake of convenience in describing the apparatus I will hereinafter refer to the parts as if they were to be used in connection with an automobile; but it will be understood, as before stated, that the invention is applicable to other machines.

Mounted on the lower surface of the support 10 is a hanger 11, which is provided at its lower portion with a bearing 12, in which is journaled the hub 13 of the friction disk or wheel 14, which, as is clearly shown in the different views of the drawings, is concavo-convex and has on its face or concaved surface a series of concentrically-arranged ribs or projections 15, 16, 17, and 18, spaced apart and constructed as will be presently explained. The hub 13 of the wheel or disk 14 is provided on its outer surface with an annular groove 19 and is formed with a longitudinal opening 20, preferably rectangular in shape, to receive a portion of the correspondingly-shaped clutch-bar 21, which has in one of its ends, which will be termed the "front" end, a conical-shaped opening 22 and in its other end an opening 23, which is preferably rectangular in cross-section, to receive a correspondingly-shaped portion 24 of a supporting-shaft 25, which is journaled in a box or bearing 26 on the lower portion of a hanger 27, which is secured to the support. The rear portion of the clutch-bar 21 is provided with a groove 28 for the reception of a collar 29, used in conjunction with suitable connections for sliding the clutch-bar back and forth within the hub of the friction-disk. The rear end of the supporting-shaft 25 is connected, preferably by means of a universal joint 30, to the front end of a shaft or rod 31, the other end of which may be suitably connected to the driving mechanism on the rear axle. (Not here shown.)

Extending laterally and horizontally forward from each side of the journal-box 26 is an arm 32, near the free end of each of which is fulcrumed a lever 33, each of which has on its inner portion oppositely-extending projections 34 and 35, to which are connected at one of their ends rods 36 and 37, respectively. The rods 36 are pivotally connected at their other ends to rods 38, which are connected at their front ends to the collar 29 on each side of the clutch-bar. Pivotally connected at one of their ends to each of the rods 36 is another bar 39, the other end of each of which is pivotally secured to the inner portion of the arms 32 on the journal-box for the supporting-shaft. Pivotally connected at one of its ends to each of the rods 37 is a rod 40, the other end of which is similarly secured to one of said arms. Pivotally secured to each of the rods 37 and extending forwardly therefrom is a rod 41, which are similarly secured at their front ends to the collar 42 on each side of the hub 13, which collar is located in the groove 19 therein. Transversely journaled on brackets 43, secured to the support 10, between the hangers 11 and 27, is a rock-shaft 44, on which is fixed near each of its ends a bell-crank lever 45, one arm of which is connected by a rod 46 to the levers 33, which through their connections move the clutch-bar and friction-disk longitudinally. Connected at one of its ends to the other arm of one of the levers 45 is a rod 47, which extends upwardly through an opening 48 in the support and has its upper end connected to a lever 49 or pedal.

Located horizontally in front of the friction-disk and usually somewhat above a horizontal plane extending through its center are curved rails 50, which form a track for the movable journal-box 51, which carries the shafts of the friction or driving rollers. As shown in Figs. 1, 2, 3, and 6 of the drawings, the rails 50 are curved to correspond with the arc described by the journal-box 51 in its movements, and the said rails are supported by means of brackets 52, secured to the lower surface of the supporting-frame. Journaled longitudinally in the box 51 is the main driving-shaft 53, which has its front end connected, preferably by means of a universal coupling 54, to one end of a shaft 55, which is connected at its other end to the driving mechanism of the engine. (Not shown.) Rigidly mounted on the rear or inner end of the shaft 53 is a cone-shaped roller 56, which is adapted to fit in the opening 22 of the clutch-bar 21 and to impinge the ribs of the friction-wheel 14 when desired. Mounted on the shaft 53 within the journal-box 51 is a gear 57, which meshes with a gear 58, mounted on the auxiliary shaft 59, which is longitudinally journaled on the box 51 and in parallelism with the shaft 53, as is clearly shown in Fig. 4 of the drawings. Rigidly mounted on the rear or inner end of the auxiliary shaft 59 is a friction-roller 60, which is adapted to impinge the opposite surfaces of the ribs on the friction-disk from that impinged by the cone-shaped friction-roller. Extending horizontally forward from the sides of the journal-box 51 are arms 61, which have at their front ends a segmental rack 62, which is horizontally pivoted on the lower portion of a bracket 63, which is secured at its upper end to the supporting-frame. Mounted on a shaft 64, horizontally journaled on the bracket 63, is another segmental rack 65, which meshes with the rack 62 and has a projection 66, to which is connected one end of a rod 67, the other end of which is connected to a lever 68, fulcrumed on the main frame and used for shifting the positions of the journal-box 51 and the friction-rollers which said box carries, so as to regulate the speed.

By reference to Fig. 4 of the drawings it will be seen that each of the ribs 15 and 16 has its inner surface or periphery beveled, while the rib 17 has its outer surface or periphery beveled and its inner surface in parallelism with the adjacent surface of the rib 16, which last-named rib is employed in conjunction with the friction-rollers 56 and 60 to impart the lowest speed to the machine.

From the foregoing and by reference to the drawings it will be readily understood and clearly seen that when the parts are in their normal positions, as represented by continuous lines in Figs. 1, 3, and 4 of the drawings, the main or cone-shaped driving-roller 56 will be in engagement with the opening 22 in the front end of the clutch-bar 21, thus through its connections with the propelling mechanism of the rear axle transmitting thereto power from the engine and furnishing the highest rate of speed. By moving the lever 49 to the position shown by dotted lines in Fig. 2 it is apparent that the shaft 44, through its connections with said lever, will be rocked, thus moving the levers 33 to the positions shown by dotted lines in Fig. 1, which operation will simultaneously retract the clutch-bar 21 on the rectangular portion 24 of the supporting-shaft, so as to disengage the front end of the clutch-bar from the driving-roller 56 and advance the friction-disk. In this operation the lever 49 when moved to a certain point will advance the friction-disk slightly or sufficiently to enable the friction-rollers 56 and 60 to clear the free ends of the ribs on the friction-disk. When in this position, the journal-box 51 and friction-rollers carried thereby may be turned by means of the racks 62 and 65 and lever 68 to the position indicated by full lines in Fig. 6 of the drawings, when the friction-disk may be further advanced, when it is apparent that the friction-roller 56 will engage the beveled surface of the rib 15, while the friction-roller 60 will engage or impinge the opposite surface of said rib, and as said rollers are adapted to be rotated in opposite directions they will coöperate with each other in rotating the friction-disk. When in the above-named position and when the friction-rollers are in engagement with the rib 15, a medium rate of speed will be furnished; but if it is desired to provide the lowest rate of speed the friction-disk 14 may be slightly retracted by means of the lever 49 and its connections with said disk, so that the friction-rollers will be disengaged from the rib 15, when by moving the lever 68 in the proper direction it will through its connections with the journal-box 51 radially move said box, so that the friction-rollers may be brought into engagement with the rib 16, when the same operation of driving the friction-disk will be repeated. In order to reverse the machine, the journal-box carrying the friction-rollers may be moved to the position indicated by dotted lines in Fig. 6 of the drawings, when the cone-shaped friction-roller 56 will engage the outer or beveled surface of the rib 17 and the roller 60 will engage the inner surface of the rib 18, thus causing the friction-disk to move or turn in the opposite direction.

It is evident from the above description that the improved mechanism constructed according to my invention is capable of some modification without material departure from the principles and spirit of the invention, and for this reason I do not wish to be understood as limiting myself to the precise form and arrangement of the several parts of the device herein set forth in carrying out my invention in practice. For example, while I have shown the friction-disk provided with four ribs, yet I do not desire to be limited to that number, as I may employ more or less. Further, I have shown the shaft 25 as having its front end squared to fit in the rectangular opening 23 of the clutch-bar; but it is obvious that the rear end of the clutch-bar might be squared to fit in a correspondingly-shaped opening in the shaft 25, when the same purpose would be accomplished; nor do I wish to be limited to the constructions shown for shifting the positions of the journal-box 51, the friction-disk 14, and clutch-bar 21, as I may employ other means for moving said parts.

Having thus fully described my invention, what I claim as new, and desire to secure by Letters Patent, is—

1. In a power-transmitting and speed-controlling mechanism, the combination with the supporting-frame, of a friction-disk having a central opening and journaled on said frame, a clutch-bar movable longitudinally in said opening but rotatable with the friction-disk and having in one of its ends an opening, a shaft loosely connected to the other end of said bar, a main driving-shaft journaled in alinement with the clutch-bar, a friction-roller on one end of the driving-shaft to engage the opening of the clutch-bar, means to slide said bar back and forth, and means connected to the driving-shaft and adapted for frictional contact with the friction-disk, substantially as described.

2. In a power-transmitting and speed-controlling mechanism, the combination with the supporting-frame, of a friction-disk provided with a central opening and journaled on said frame, a clutch-bar provided in one of its ends with a conical opening and movable longitudinally in the opening of the friction-disk but rotatable therewith, a shaft loosely connected to the other end of the clutch-bar, a driving-shaft journaled in alinement with said bar, a conical friction-roller on one end of the driving-shaft to engage the conical opening of the clutch-bar, means to slide said bar back and forth, and means connected to the driving-shaft and adapted for frictional contact with the friction-disk, substantially as described.

3. In a power-transmitting and speed-controlling mechanism, the combination with the supporting-frame, of a concave friction-disk movably journaled thereon, said disk having a central opening and provided with a series of concentric ribs on its concaved face, a clutch-bar movable longitudinally in said opening but rotatable with the disk and having in one of its ends an opening, a shaft loosely connected to the other end of said bar, a driving-shaft journaled and movable radially near one end of the clutch-bar, a friction-roller on one end of the driving-shaft to engage the opening of the clutch-bar, and means to slide said bar back and forth, substantially as described.

4. In a power-transmitting and speed-controlling mechanism, the combination with the supporting-frame, of a concave friction-disk movably mounted thereon, said disk having a central opening and provided with a series of concentric ribs on its concaved face, a clutch-bar movable longitudinally in said opening but rotatable with the disk and having in one of its ends an opening, a shaft loosely connected to the other end of said bar, a driving-shaft journaled and movable radially near one end of the clutch-bar, a friction-roller on one end of the driving-shaft, means to slide said bar and friction-disk back and forth, substantially as described.

5. In a power-transmitting and speed-controlling mechanism, the combination with the supporting-frame, of a concave friction-disk movably journaled thereon, said disk having a central opening and provided with a series of concentric ribs on its concaved face, a clutch-bar movable longitudinally in said opening but rotatable with the disk and having in one of its ends an opening, a shaft loosely connected to the other end of said bar, a driving-shaft journaled and movable radially near one end of the clutch-bar, a friction-roller on one end of the driving-shaft, means to slide said bar and friction-disk back and forth, and means to move the driving-shaft radially, substantially as described.

6. In a power-transmitting and speed-controlling mechanism, the combination with the supporting-frame, of a concave friction-disk movably journaled thereon, said disk having a central opening and provided with a number of concentric ribs on its concaved face, a clutch-bar movable longitudinally in said opening but rotatable with the disk and having in one of its ends an opening, a shaft loosely connected to the other end of said bar, a main driving-shaft and an auxiliary driving-shaft journaled in parallelism and movable radially, a friction-roller on each of said shafts, and means to move said shafts radially, substantially as described.

7. In a power-transmitting and speed-controlling mechanism, the combination with the supporting-frame, of a concave friction-disk movably journaled thereon, said disk having a central opening and provided with a number of concentric ribs on its concaved face, a clutch-bar movable longitudinally in said opening but rotatable with the disk and having in one of its ends a conical-shaped opening, a shaft loosely connected to the other end of said bar, a main driving-shaft and an auxiliary driving-shaft journaled in parallelism and movable radially, a conical-shaped friction-roller on one end of the main driving-shaft, another friction-roller on one end of the auxiliary shaft, and means to move said shafts radially, substantially as described.

8. In a power-transmitting and speed-controlling mechanism, the combination with the supporting-frame, of a concave friction-disk movably journaled thereon, said disk having a central opening and provided with a number of concentric ribs on its concaved face, a clutch-bar movable longitudinally in said opening but rotatable with the disk and having in one of its ends a conical-shaped opening, a shaft loosely connected to the other end of said bar, a main driving-shaft and an auxiliary driving-shaft journaled in parallelism and movable radially, a conical-shaped friction-roller on one end of the main driving-shaft, another friction-roller on one end of the auxiliary shaft, means to move the clutch-bar and friction-disk back and forth, and means to move the main and auxiliary driving-shafts radially, substantially as described.

9. In a power-transmitting and speed-controlling mechanism, the combination with the supporting-frame, of a concave friction-disk movably journaled thereon, said disk having a central opening and provided with a number of concentric ribs on its concaved face, one of said ribs having its inner surface beveled, a clutch-bar movable longitudinally in said opening but rotatable with the disk and having in one of its ends a conical-shaped opening, a main driving-shaft and an auxiliary driving-shaft journaled in parallelism and movable radially, a conical-shaped friction-roller on one end of the main driving-shaft, another friction-roller on one end of the auxiliary shaft, means to move the clutch-bar and friction-disk back and forth, and means to move said driving-shafts radially, substantially as described.

10. In a power-transmitting and speed-controlling mechanism, the combination with the supporting-frame, of a concave friction-disk movably journaled thereon, said disk having a central opening and provided with a number of concentric ribs on its concaved face, one of said ribs having its inner surface beveled, another one of said ribs having its outer surface beveled, a clutch-bar movable longitudinally in said opening but rotatable with the disk and having in one of its ends a conical-shaped opening, a main driving-shaft and an auxiliary driving-shaft journaled in parallelism and movable radially, a conical-shaped friction-roller on one end of the main driving-shaft, another friction-roller on one end of the auxiliary driving-shaft, means to move the clutch-bar and friction-disk back and forth, and means to move said driving-shafts radially, sustantially as described.

11. In a power-transmitting and speed-controlling mechanism, the combination with the supporting-frame, of a concave friction-disk movably journaled thereon, said disk having a series of concentric ribs on its concaved face, one of said ribs having its inner surface beveled, another of said ribs having its outer surface beveled, a main driving-shaft and an auxiliary driving-shaft journaled in parallelism and movable radially near said ribs, a beveled friction-roller on one end of the main driving-shaft, another friction-roller on one end of the auxiliary shaft, means to move the friction-disk back and forth, and means to move the driving-shafts radially, substantially as described.

DYCKE H. REIMERS.

Witnesses:
 CHAS. C. TILLMAN,
 A. GUSTAFSON.